United States Patent Office

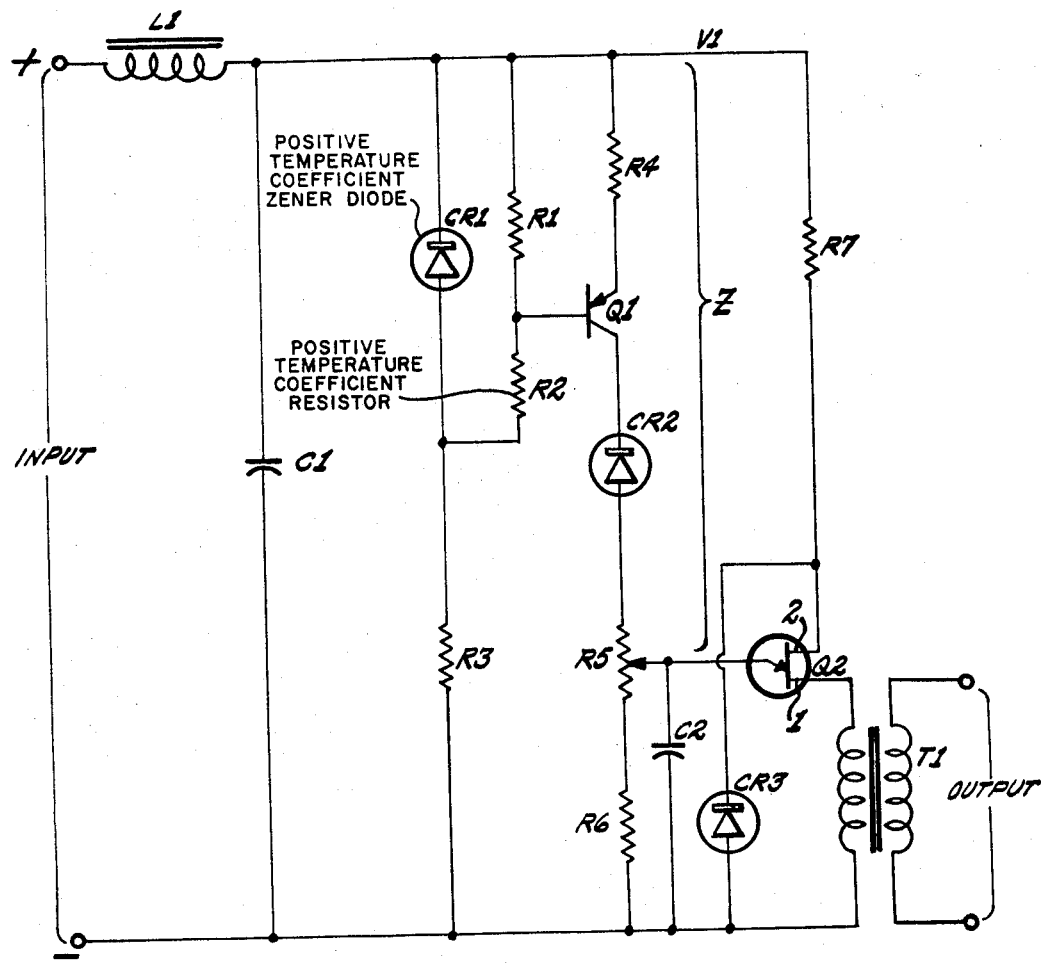

3,388,347
Patented June 11, 1968

3,388,347
DC VOLTAGE LEVEL SENSING RELAXATION OSCILLATOR
Richard A. Dinzl, Littleton, Colo., and Charles W. Singleterry, Huntsville, Ala., assignors to the United States of America as represented by the Secretary of the United States Air Force
Filed Apr. 12, 1967, Ser. No. 632,158
5 Claims. (Cl. 331—111)

ABSTRACT OF THE DISCLOSURE

A relaxation oscillator that is sensitive to the input DC voltage level. When the input voltage is above a predetermined level, the circuit oscillates; and conversely, when the input voltage level is below the predetermined voltage level, the circuit does not oscillate. The output of the circuit taken from an isolation transformer is used to drive any type of control circuit required to fulfill the system requirements.

---

This invention relates to voltage sensing circuits, and more particularly, to a relaxation oscillator circuit utilizing semiconductor devices which is sensitive to the input DC voltage level.

The instant invention has utility in the operation of many communication and measuring systems which require that a voltage source remain within predetermined limits.

A prior art voltage sensing circuit is described in the General Electric Transistor Manual, sixth edition, at pages 196 and 197. However, such a circuit has some disadvantages which are overcome by the following objects.

A primary object of this invention is to provide apparatus which will inherently respond to a wider range of input DC voltages.

Another object of this invention is to provide an improved DC voltage sensing circuit which is powered by the source being monitored.

Still another object of this invention is to provide an improved DC voltage sensing circuit having better temperature stability and greater accuracy.

To the accomplishment of the foregoing and additional objects, the present invention comprehends the utilization of a relaxation oscillator circuit which is powered by the DC voltage source being monitored. Briefly, to prevent the oscillation frequency from varying with the line voltage, a constant current generator is placed in the impedance and then a capacitor is charged to the firing voltage of a unijunction transistor (a double-based diode) at a constant time rate regardless of the fluctuations in line voltage. The exact level of voltage above which the circuit oscillates is determined by the setting of a potentiometer. Provisions are made for temperature compensation. A transformer provides electrical isolation between the voltage source being monitored and the voltage source driving the output device.

A better understanding of the present invention may be had by referring to the following detailed description taken in conjunction with the accompanying drawing which is a schematic diagram of the preferred embodiment.

It is to be noted that the design criteria used for the circuit shown in the drawing was based on the requirement that a voltage source be monitored with a circuit having the following characteristics:

(a) Input impedance of 1500 ohms minimum.
(b) Adjustable monitoring range of 23–29 volts DC minimum.
(c) Accuracy of 1% of preset value within the adjustable range.
(d) Electrically isolated from power sources used for driving output devices.

Now referring to the drawing, choke L1 and capacitor C1 form a low-pass L-type filter. The impedance, Z, between the line V1 and the wiper on potentiometer R5, and capacitor C2 determine the frequency of oscillation of unijunction transistor Q2. To prevent the oscillation frequency from varying with the line voltage, a constant current generator (C1, R1, R2, R4 and Q1) is placed in the impedance Z. With the constant current source in Z, the capacitor C2 will charge to the firing voltage of Q2 at a constant time rate regardless of the fluctuations in line voltage V1.

The resistor R6 and potentiometer R5 provide a current path to ground through Zener diode CR2 thereby forcing it into its stable operating region. Hence, CR2 is a voltage reference that increases the resolution of the "turn-on turn-off" voltage level of the oscillator. The exact level of voltage above which the circuit oscillates is determined by the setting of potentiometer R5.

Resistor R2 has a predictable positive temperature coefficient which provides temperature stability by compensating for the positive coefficient of CR1 and the negative coefficient of the base-emitter junction of Q1. Resistor R3 limits current through Zener diode CR1, a constant voltage source, to a value which holds it in its stable operating region.

Zener diode CR3 regulates the voltage at base 2 of Q2 so that Q2 will operate in its negative resistance region regardless of the magnitude of positive excursions of line voltage V1. Resistor R7 limits current through CR3 to a value corresponding to its stable region. Also, R7 provides temperature compensation for Q2. Transformer T1 provides electrical isolation between the voltage source being monitored and the voltage source driving the output device.

Therefore, while a single embodiment of the invention has been illustrated and described, it is to be understood that the invention is not limited thereto but contemplates such modifications in form and details and further embodiments as will occur to those skilled in the art without departing from the spirit and scope of the invention.

We claim:
1. A circiut for monitoring a DC voltage source comprising an input consisting of the source of DC voltages to be monitored, said source having poistive and negative terminals, low-pass filter means connected across said terminals, first resistor and constant voltage source means connected in series and connected across said DC terminals, second and third resistor means connected in series in a circuit connected in parallel with said constant voltage means, a transistor having base, emitter and collector electrodes, said base electrode connected to the junction of said second and third resistors, a fourth resistor connected between the poistive side of said DC source and the emitter electrode of said transistor, voltage reference means, potentiometer means having a wiper, said voltage reference means connected at one end to said collector electrode and at the other end to said potentiometer means, fifth resistor means connected between said potentiometer means and the negative side of said DC source, unijunction transistor means having an emitter electrode and first and second base electrodes, said unijunction emitter electrode connected to the wiper of said potentiometer means, capacitor means connected between said wiper arm and the negative side of said DC source, current limiting means connected between the positive side of said DC source and said unijunction transistor, firstbase electrode, means connected between the junction of said current limiting means and said first-base electrode and the negative side of said DC source for regu- lating the voltage at said unijunction transistor, second base electrode, and electrical isolation transformer means having primary windings connected between said unijunction transistor, second-base electrode and the negative side of said DC source and secondary windings connected to a load.

2. The circuit as described in claim 1 wherein said low-pass filter means comprises an inductor and a second capacitor connected in series in a circuit having one end connected to said poistive terminal and the other end connected to said negative terminal.

3. The circuit as described in claim 1 wherein said constant voltage source comprises a first Zener diode, said voltage reference means comprises a second Zener diode, and said means for regulating the voltage at said unijunction transistor, first-base electrode comprises a third Zener diode.

4. The circuit as described in claim 1 wherein said second resistor is characterized by a positive temperature coefficient to provide temperature stability.

5. The circuit as described in claim 1 wherein said current limiting means comprises a sixth resistor.

No references cited.

JOHN KOMINSKI, *Primary Examiner.*